United States Patent [19]
Hanemaayer

[11] Patent Number: 5,653,262
[45] Date of Patent: Aug. 5, 1997

[54] SEWER DISCHARGE AND STOWING SYSTEM FOR A RECREATION VEHICLE

[76] Inventor: Jacobus N. Hanemaayer, 100 Shirley Avenue, Kitchener, Ontario, Canada, N2B 2E1

[21] Appl. No.: 616,573

[22] Filed: Mar. 15, 1996

[51] Int. Cl.$^6$ .................................... F16K 27/12
[52] U.S. Cl. ........................ 137/899; 137/355.16
[58] Field of Search ................. 137/899, 355.16

[56] References Cited

U.S. PATENT DOCUMENTS

| | | | |
|---|---|---|---|
| 3,811,462 | 5/1974 | Feliz | 137/899 |
| 4,133,347 | 1/1979 | Mercer | 137/899 |
| 4,779,650 | 10/1988 | Sargent et al. | 137/899 |
| 4,854,349 | 8/1989 | Foreman | 137/355.16 |

*Primary Examiner*—A. Michael Chambers
*Attorney, Agent, or Firm*—Killworth Gottman Hagan & Schaeff LLP

[57] ABSTRACT

A recreational vehicle or the like including a vehicle body having opposed sides and a waste storage tank with an axially extendable flexible hose connected to a waste outlet of said tank, said waste outlet being at a lower portion of the body adjacent one of the sides thereof. An elongated tubular housing is provided within which said flexible hose extends such that the hose can be stored in said housing and also drawn outwardly of a distal end of the housing toward a waste receptacle. The housing has an articulated connection at a proximal end thereof adjacent said waste outlet to enable said housing to be articulated relative to the body of the vehicle from a storage position wherein said housing extends generally parallel to said one of said body sides to a use position wherein said housing extends outwardly from said one side of the vehicle body.

15 Claims, 7 Drawing Sheets

SEWER DISCHARGE AND STOWING SYSTEM FOR A RECREATION VEHICLE

BACKGROUND OF THE INVENTION

This invention relates to an improved waste drainage and stowing system for recreational vehicles and the like.

Recreational vehicles having self-contained bathrooms and sewer systems must employ a suitable means for conducting the waste from the storage tanks to a suitable disposal receptacle. In the past many of these vehicles have employed an externally accessible housing for containing a length of hose which may be manually connected to a hose fitting on an outlet stub pipe of the vehicle waste storage tank. The other end of the hose, in use, was extended to the inlet of the disposal receptacle. This has proven to be a clumsy and a somewhat messy operation and it is necessary to handle the hose and flush out the waste after use to avoid excessive build-up of odours.

In U.S. Pat. No. 4,133,347 issued Jan. 9, 1979 to Albert Mercer, there is described a simple add-on unit which connects directly to the outlet stub pipe of the waste storage tank of the recreational vehicle. The unit includes a rigid outer cylindrical housing having one end which is arranged to connect to the existing outlet stub pipe of the waste tank. This cylindrical housing contains an axially compressible and expandable hose of the accordion type, which hose is connected at one end to that end of the housing which is connected to the stub pipe. The other end of the hose is extendible outside the housing to a disposal receptacle, such other end having an end sleeve connected to it with the end sleeve having a removable cap. This end sleeve is provided with connections so as to mount same within the end of the rigid cylindrical housing.

Reference may also be had to my related Canadian Patent No. 1,269,802 issued Jun. 5, 1990 which is closely related to the structure disclosed in the Mercer patent. A rigid cylindrical end piece is provided on the distal end of the hose, which end piece is adapted to be fitted to the end of the housing when the hose in the axially compressed stored position. The above-noted patent particularly provides a novel securement for releasably attaching this end piece to the aforementioned end of the housing.

The types of recreational vehicles with which this invention is particularly concerned are known in the industry as "Class B" recreational vehicles. In more recent years there has been a tendency to make these vehicles with downwardly extended lower side wall portions providing a type of "ground effect" skirt thereby to enhance the appearance of the vehicle and to hide from view a number of components which are secured beneath the floor of the vehicle. Insofar as the waste drainage attachments are concerned, there are a number of pivoting, rigid and telescoping waste drainage systems which have been used over a number of years up to the present. These existing systems however have a number of problems. The rigid systems must be connected to the storage tank at a point low enough to allow the drainage pipe to clear the lowermost edges of the sidewall of the vehicle when the drain pipe is extended outwardly. This is not feasible when utilizing vehicles with relatively low "ground effect" side walls as noted above. If the sidewalls are made to be high enough for a drainage pipe to clear its bottom when extended, the pipe can then be seen when stowed away, this obviously being undesirable from at least the appearance point of view. It is therefore desirable to have a waste drainage attachment coupled with a suitable stowing or storage system in order that the drainage system will be out of view when stored away, which may be handled very simply by the user and which is very economical to manufacture. At the same time the system should be arranged so that it can be utilized on recreational vehicles with low "ground effect" side wall portions or skirts as noted above.

SUMMARY OF THE INVENTION

A basic object of the invention is to alleviate the problems noted above and to provide a waste discharge system which can be securely stored out of sight above the minimum road clearance of the vehicle sidewall and which can be lowered and put into use in a relatively simple operation while clearing the bottom of the vehicle sidewall when extended for use.

According to one aspect of the invention there is provided a recreational vehicle or the like including a vehicle body having opposed sides and a waste storage tank with an axially extendable flexible hose connected to a waste outlet of said tank, said waste outlet being at a lower portion of the body adjacent one of the sides thereof. An elongated tubular housing is provided within which said flexible hose extends such that the hose can be stored in said housing and also drawn outwardly of a distal end of the housing toward a waste receptacle. The housing has an articulated connection at a proximal end thereof adjacent said waste outlet to enable said housing to be articulated relative to the body of the vehicle from a storage position wherein said housing extends generally parallel to said one of said body sides to a use position wherein said housing extends outwardly from said one side of the vehicle body.

In a further aspect of the invention there are provided structures defining a storage compartment extending partway alongside said one side of the body and adapted to receive said housing and said extendible hose and to define the storage position thereof.

In a still further aspect of the invention the storage compartment is defined in part by a trap door which supports said housing and hose when closed and which can pivot downwardly below the vehicle body to release said housing from said compartment following which said housing can be moved together with said hose so as to extend outwardly from the vehicle body.

Still further according to another feature of the invention said storage compartment also includes an upper door which can be opened to gain access to said compartment and to permit release of said trap door to allow it to pivot downwardly.

According to a still further feature of the invention said upper door is shaped to define a step to facilitate entry into the vehicle body, the step-door thus defined being pivotally mounted for movement from a lower step-providing position overlying the top of the storage compartment to a raised position wherein access to the interior of the storage compartment is gained.

In a preferred form of the invention a fixed rail extends along said one side of the vehicle body and outboard thereof for supporting said step-door when in the down, step-providing position. Preferably, said trap door has hooks hingedly affixed thereto along an outer edge thereof and adapted to be hooked onto said fixed rail to releasably secure said trap door in the raised housing and hose supporting position. Furthermore, said step-door, in the down position, preferably overlies said trap door hooks to substantially prevent accidental release thereof from said rail.

As a still further aspect of the invention said vehicle includes downwardly extended lower side wall portions and said proximal end of said elongated housing includes a relatively short housing section loosely pivotally connected between said tank waste outlet and the remaining section of said elongated housing to permit said housing sections to drop downwardly by a selected distance below the waste tank outlet so as to clear bottom edge portions of the vehicle lower side wall portions when said elongated housing is moved to an outwardly extending position relative to the vehicle sidewall.

Preferably said relatively short-housing section has tapered or wedge shape ends to allow a substantial degree of articulation of the housing sections relative to one another and to said tank waste outlet.

Another feature is a shield element for retaining the hose within the housing when the latter is in the storage position.

In a preferred embodiment of the invention, plural tubular housing sections are flexibly linked together and to the waste storage tank outlet, these housing sections serving to house the axially compressible and extendible discharge hose. The flexibly linked housing sections can drop downwardly sufficiently when in use as to clear the bottom edge of the vehicle sidewall while at the same time allowing these housing sections to pivot through a substantial horizontal angle depending on the location of the sewer receptacle on the surface of the campground (which could be fore or aft of the vehicle or anywhere in between). There is also provided a hinged, generally horizontal, trap-door mounted under the driver entrance step which supports the housing sections and the hose contained therein out of view when not in use. A pair of T hinges, the leg wings of which are bent to form hooks, are hooked over a rail supporting the driver's door entrance step to secure the trap door in the closed position. This step (also referred to herein as a step-door) is also hinged for pivotal movement upwardly and downwardly. The step-door in its downward position prevents the hooks from becoming accidentally undone and provides access to the storage system when it is lifted upwardly. A bracket is associated with the step-door for retaining the step-door in both the raised and lowered positions.

Further features of the invention will become readily apparent from the description which follows taken in conjunction with the appended drawings and claims.

BRIEF DESCRIPTION OF THE VIEWS OF DRAWINGS

FIGS. 4 and 4A are cross-sections taken along line 4—4 in FIG. 2 and showing a portion of the system in its stowed position; (the step door and trap door also being shown in dashed lines in their open positions upwardly and downwardly respectively, and waste and liquid propane tanks and an exterior storage compartment also being shown in dashed lines); FIG. 4A is an enlargement of a portion of FIG. 4 for purposes of showing details more clearly;

FIGS. 5 and 5A are cross-section views of part of the vehicle and system taken along line 5—5 in FIG. 2 (the trap door being shown in dashed lines in its lowered position together with the T-hinges). Again

DETAILED DESCRIPTION OF THE PREFERRED EMBODIMENT

Figure 1:
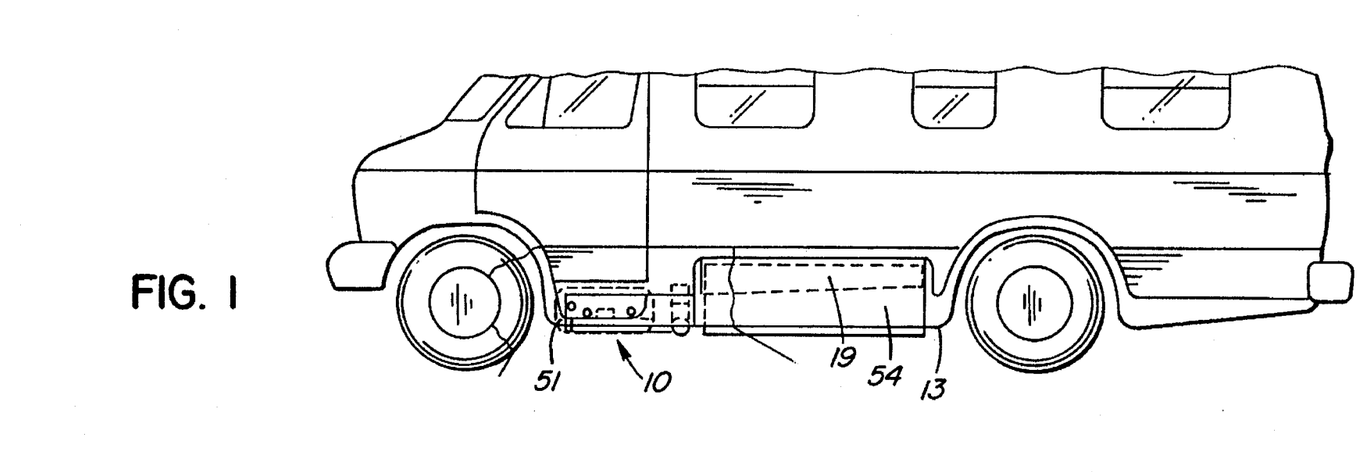
FIGS. 1 and 1A are elevation views of the driver's side of the vehicle showing the drainage system in its stowed position; (the details can be more clearly seen in the enlarged section of FIG. 1A it being realized that certain features are shown in full lines even though in fact they are hidden from view in the actual structure)
Figure 1A:
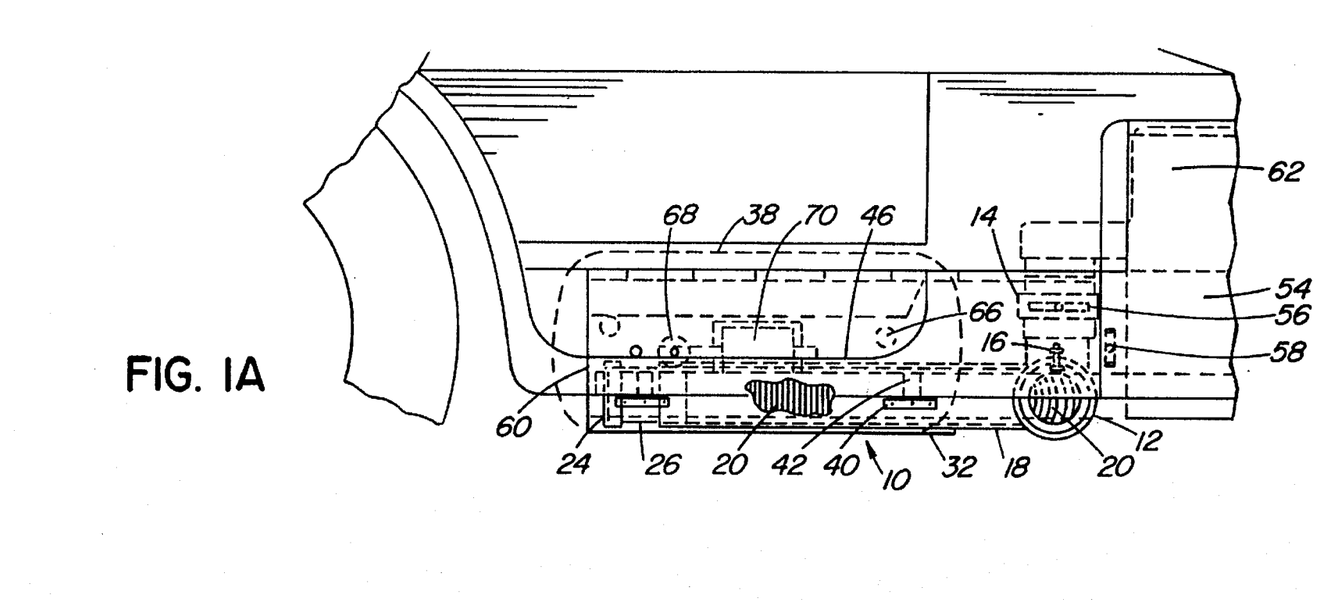
Figure 2:
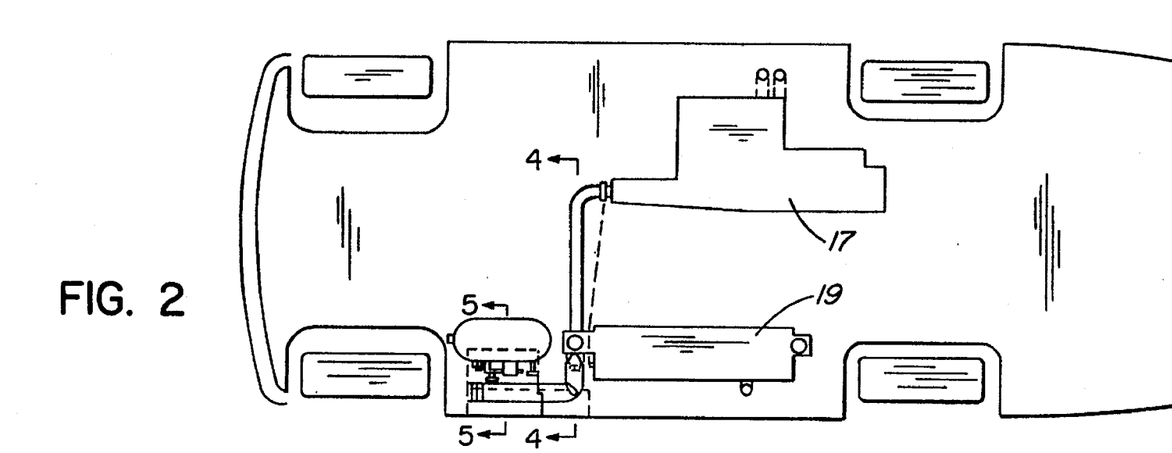
FIGS. 2 and 2A are top plan views taken just below the floor of the vehicle also showing the system in its stowed position together with the liquid propane and waste holding tanks. Certain details can be seen best in the large section of FIG. 2A.
Figure 2A:
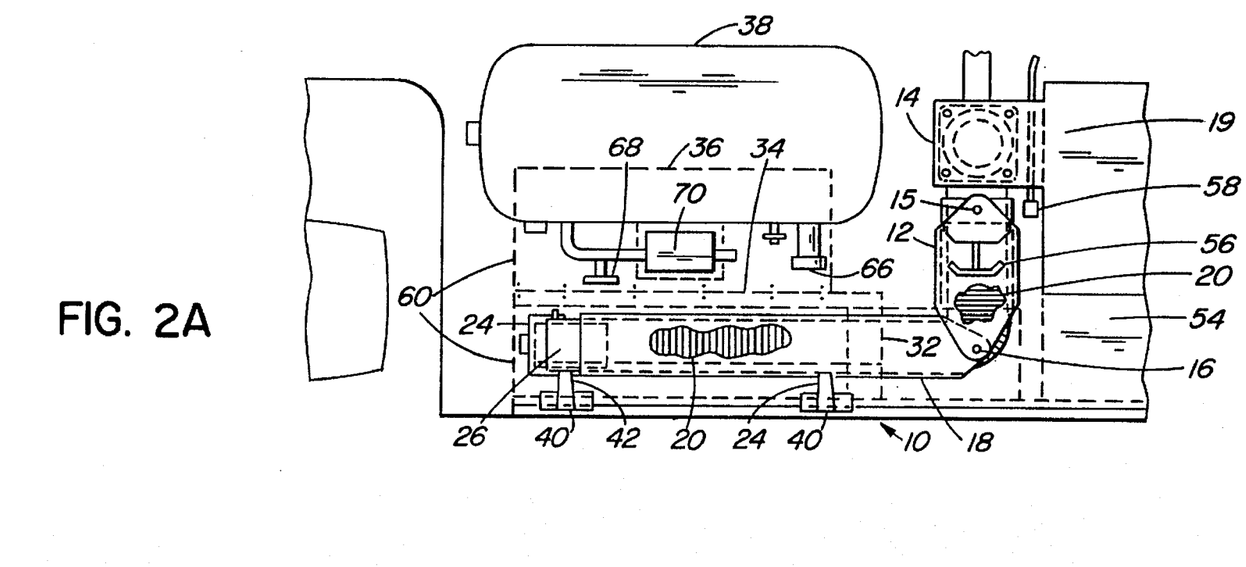

The waste drainage attachment 10 is shown in FIGS. 1 and 2 as being mounted in a stowed position under the recreational vehicle 11, the latter having downwardly extended lower side wall portions 13 which hide from view the several components secured beneath the vehicle floor including the black and grey waste holding tanks 17, 19 respectively as best seen in FIG. 2. The drainage attachment includes a short tubular housing 12 with tapered or wedged ends pivotally connected to a waste outlet valve assembly 14 by a bolt with spaced nuts 15 so that the short tubular housing 12 is connected loosely enough to pivot relative to valve assembly 14 upwardly, downwardly and horizontally. Similarly a longer tubular housing 18, with one end tapered or wedged, is also pivotally connected to the other end of the short housing 12 by a bolt with spaced nuts 16, also loose enough for relative pivoting motion as described above.

Figure 3:
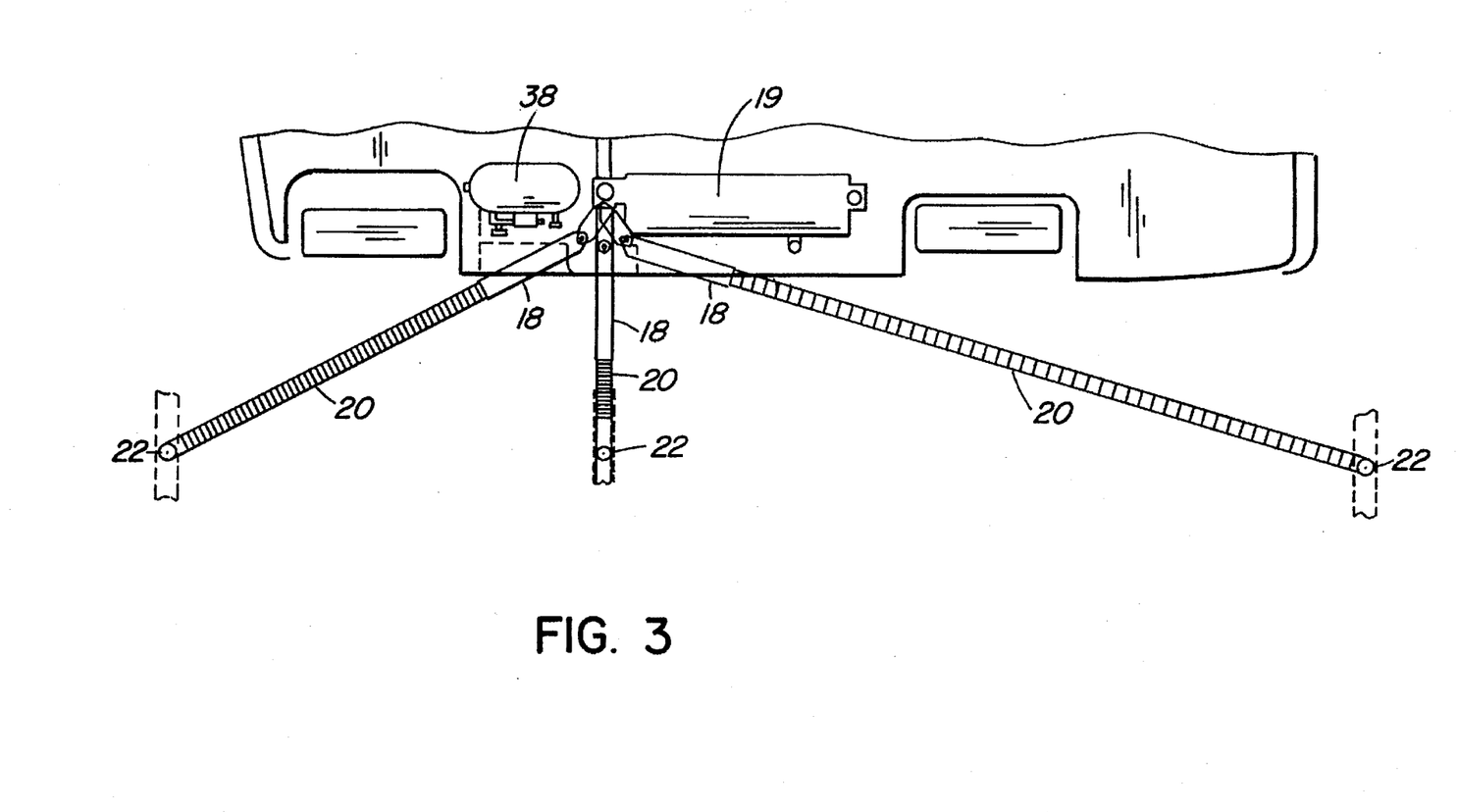
FIG. 3 is a partial top plan view below the floor of the vehicle on the driver's side showing the drainage system connected to three possible locations (or anywhere in between depending upon the location of the inground sewer receptacle in the camp site)
Figure 3A:
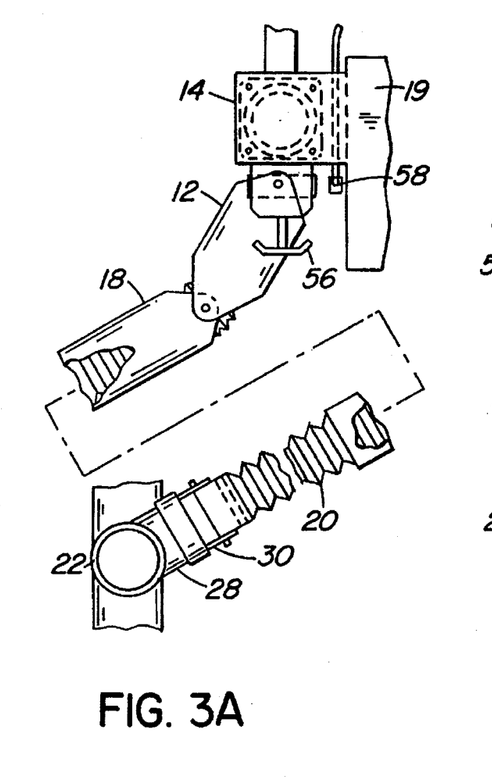
FIGS. 3A, 3B and 3C are partial top plan views of a portion of the waste drainage system when articulated to each of the three positions shown in FIG. 3.
Figures 3B, 3C:
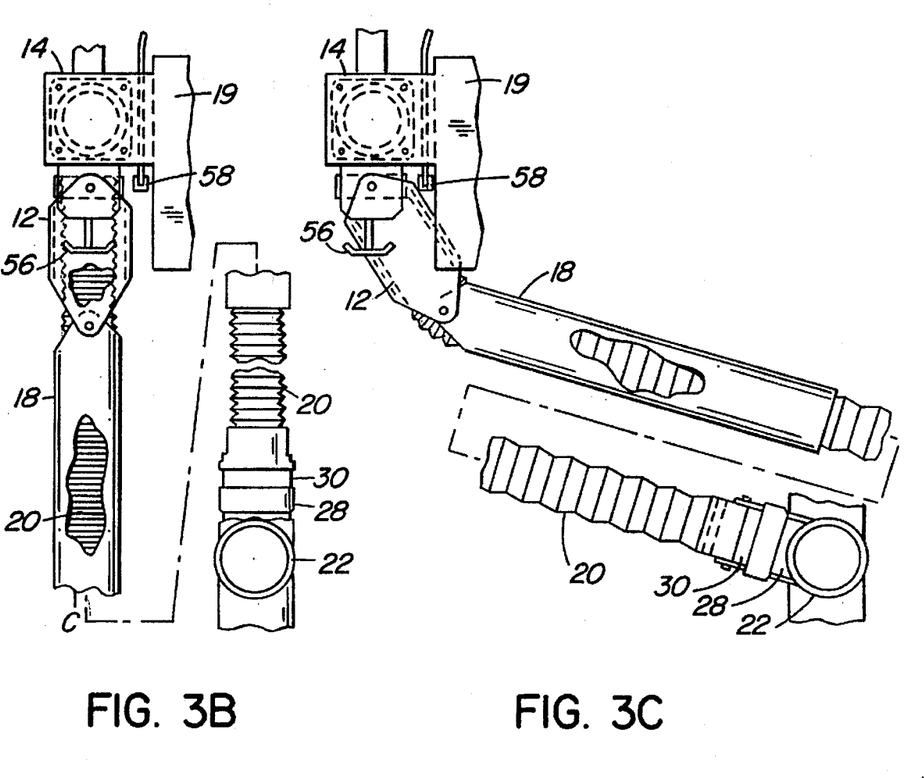
Figures 4, 4A:
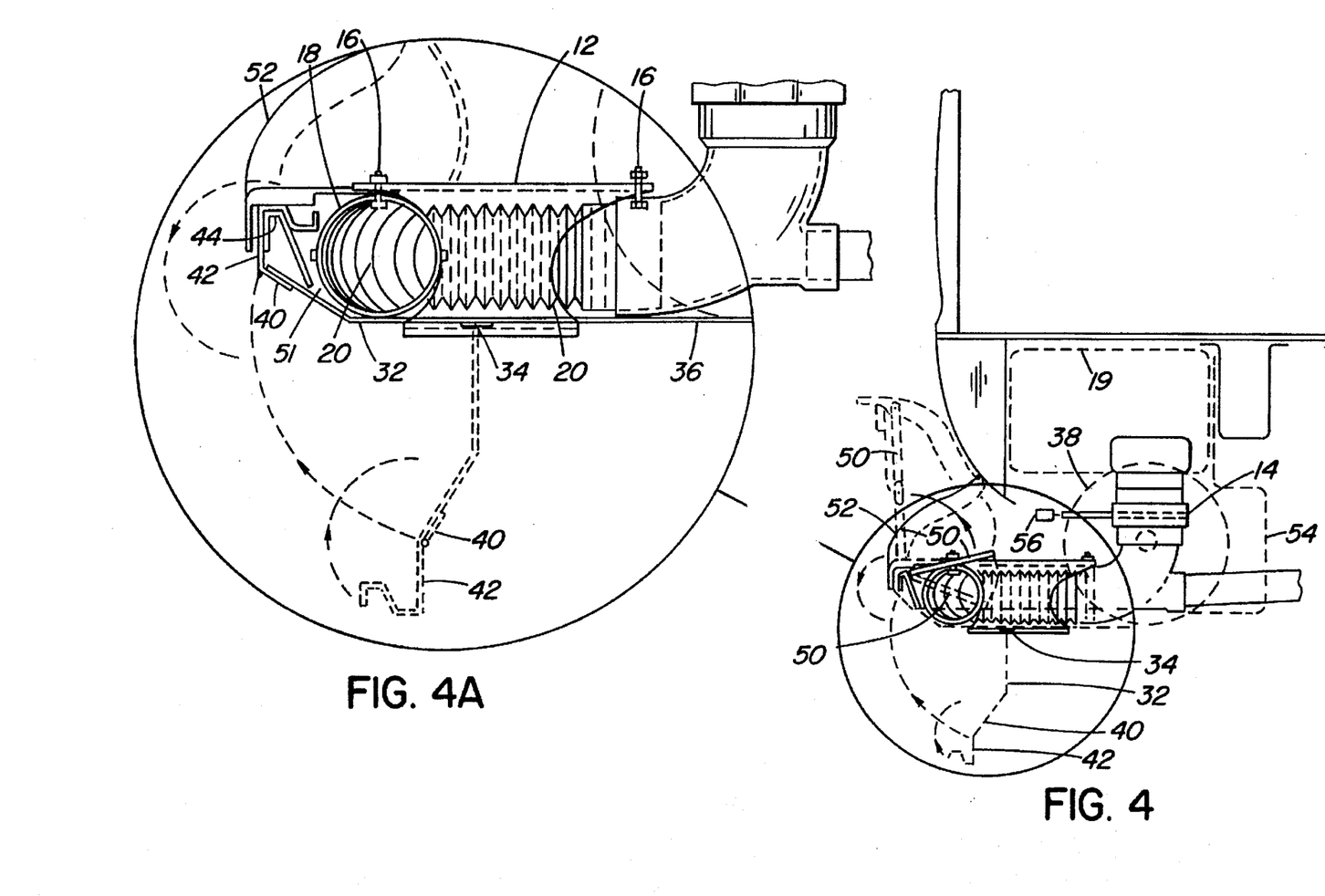
Figure 5:
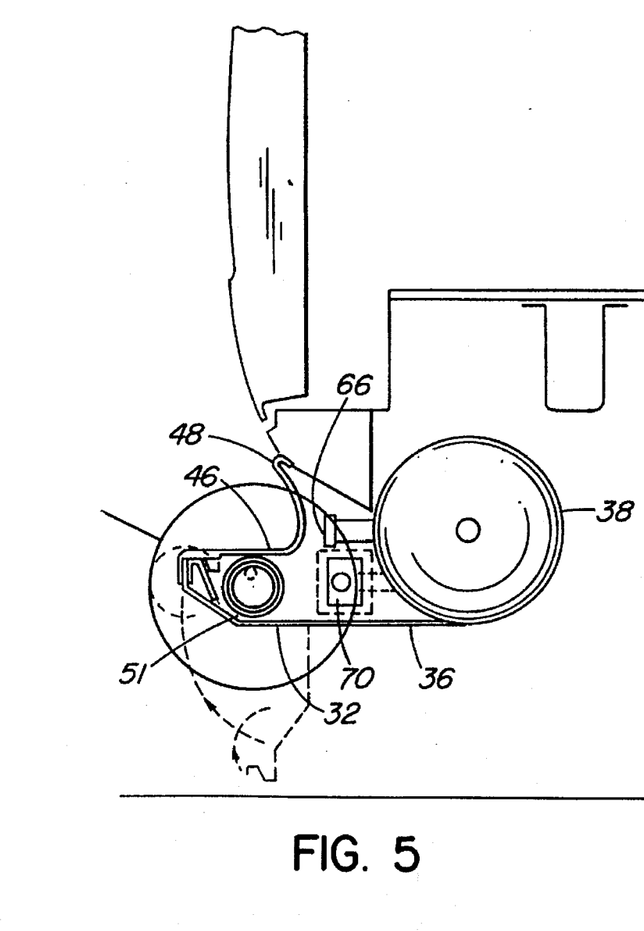
Figure 5A:
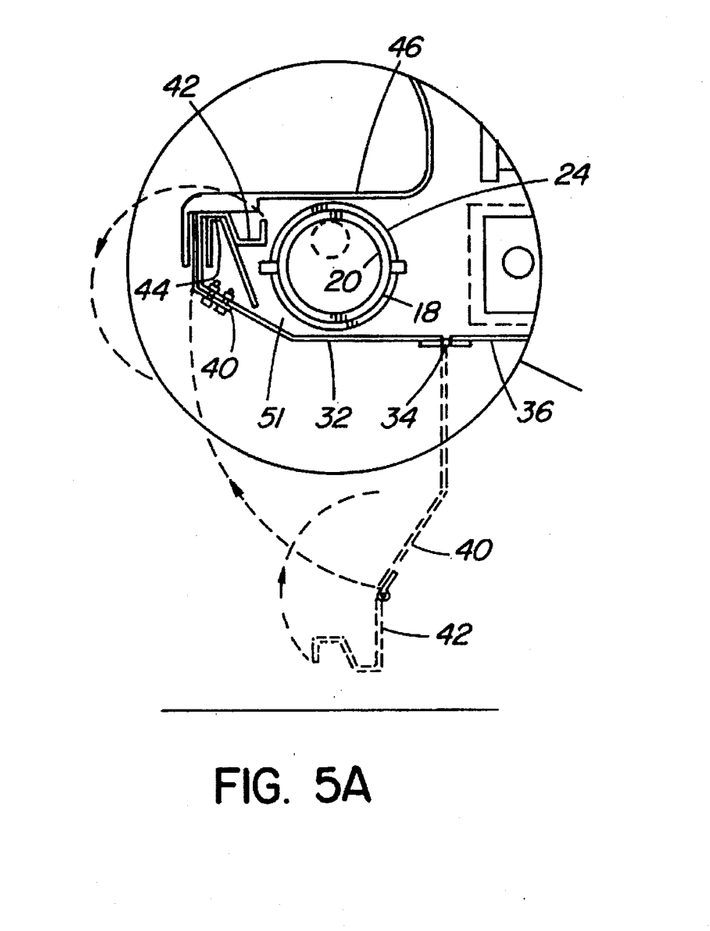
FIG. 5A is an enlargement showing certain details.
Figures 6, 6A:
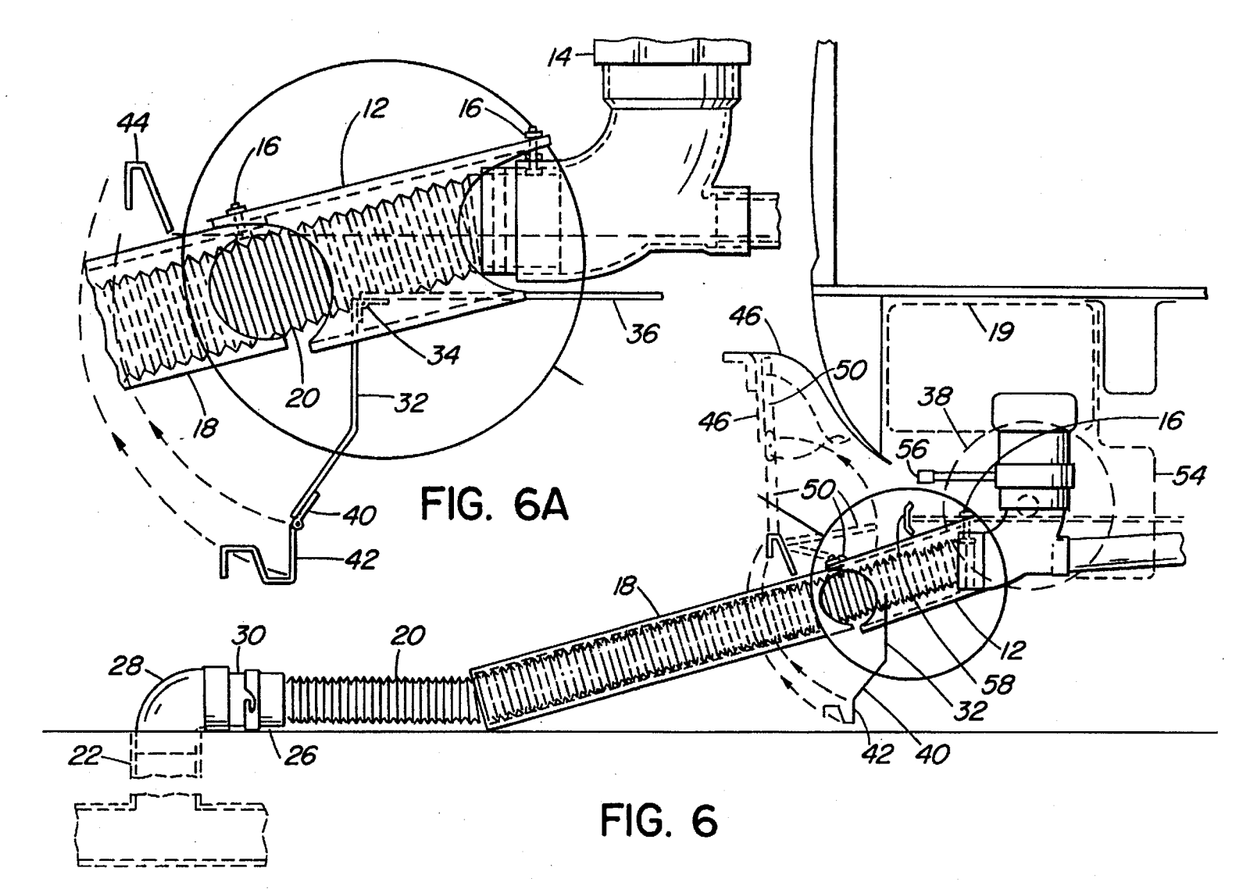
FIGS. 6 and 6A are cross-section views of the drainage system in its extended in-use position connected to an inground sewerage receptacle shown at line 6—6 in FIG. 3.

An axially compressible and extendable flexible accordion hose 20 having its inner end secured to the valve assembly 14 in the usual way is stored within both the shorter and longer tubular housings 12 and 18. Hose 20 can be axially extended such that the opposite distal end of said hose 20 may be brought outwardly of the distal end of the longer housing 18 and made to communicate with an in-ground waste receptacle 22 as shown in FIGS. 3 and 6. (This can be done after removing the end cap 24 from a cylindrical end piece 26 attached to the flexible hose 20 and attaching a 90 degree plumbing ELL 28 in a similar manner as the cap 24). The ELL 28 has a cylindrical end piece 30 secured to its female end. The end piece 30 has the same type of connection as the end cap 24. The male end of the ELL 28 is simply inserted into the sewer waste receptacle 22 during use.

The trap door 32, for supporting the drainage attachment 10 in its stowed position, is hinged by hinge 34 on one side of the door to the skid shield 36 fixed just below the liquid propane tank 38. T hinges 40 are attached to the opposing side of the trap door 32 with the leg wings being bent to form hooks 42. Hooks 42 are hooked over the fixed rail 44 which extends along the side of the vehicle body and outboard thereof and which rail supports the driver entrance step-door 46 in the down position, thereby keeping the trap door 32 and the drainage assembly 10 lying thereon securely supported.

The driver entrance step-door 46 is of a 90 degree angled shape for about two thirds of its length and is hinged by hinge 48 along the top of the vertical (when seen in the closed (lowered) position) leg of the angle. This step-door 46 is held open (up) by a collapsible (folding) bracket 50. This bracket 50 also keeps the step 46, when down, in a secure latched position by simply pulling the collapsed bracket 50 a little downwardly and off-centre relative to its pivotally attached ends. This can be achieved by reaching under the step-door 46 to gain access to the bracket. The other one-third of the driver entrance step-door 46 is curved outward at 52 to align with the exterior storage side access door 54. The full length of the driver entrance step-door 46 when up (open) gives a person access to the small partially closed storage compartment 51 effectively defined between the step-door 46 and the trap door 32 when both of the latter are in their closed positions. Hence, when step-door 46 is open the user can readily unhook the T hinge hooks 42 to lower trap door 32 and gain access to discharge valve pulls 56 and 58, drainage attachment 10, fill valve 66, shut-off valve 68, regulator 70 and other items attached to the liquid propane tank 38.

The flexible hose 20 and its end piece 26 is held in the long tube 18 by a vertically disposed forwardly located splash shield 60 which runs from the liquid propane tank 38 to the rail 44 supporting the driver entrance step-door 46. This splash shield 60 avoids the need for a latching device and thereby provides ease of operation by not having to latch or unlatch the hose 20 every time the drainage attachment 10 is put into use and then stored in the compartment 51.

Reference may be had in particular to FIGS. 6 and 6A which show the in-use configuration of the system. The step-door 46 is in the open (raised) position and held there by bracket 50 and the trap door 32 is in the lowered open position as well. The flexibly linked together tubular housing sections 12 and 18 are angled downwardly from the outlet valve assembly 14 as to pass beneath the downwardly extended body sidewall at that point even though valve assembly 14 is almost entirely above that level. Hose 20 and its outlet ELL28 extend into the waste receptacle as described previously.

To stow the system is simple. The hose 20, after closing the valve 14 and flushing, is axially compressed into the tubular housing sections 12 and 18 and the latter is swung around parallel to the vehicle side wall with the trap door 32 then being raised and the hooks 42 hooked to rail 44 to support the drainage attachment 10. The step-door 46 is then lowered to close the compartment 51 and the bracket 50 may be manipulated as described above to lock the step-door in place. Deployment of the system is essentially the reverse of the above.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

I claim:

1. A recreational vehicle or the like including a vehicle body having opposed sides and a waste storage tank with an axially extendable flexible hose connected to a waste outlet of said tank; said waste outlet being at a lower portion of the body adjacent one of the sides thereof; an elongated movable tubular housing within which said flexible hose extends such that the hose can be stored in said housing and also drawn outwardly of a distal end of the housing toward a waste receptacle; said housing having an articulated connection at a proximal end thereof adjacent said waste outlet to enable said housing to be articulated relative to the body of the vehicle from a generally horizontal storage position wherein said housing extends generally lengthwise of the vehicle body to a use position wherein said housing extends outwardly from said one side of the vehicle body; and a structure for supporting said housing in the generally horizontal storage position adjacent a lower portion of the vehicle body.

2. The recreational vehicle or the like of claim 1 including further structures defining a storage compartment extending part-way alongside said one side of the body adjacent said lower portion of the vehicle body and adapted to receive said housing and said extendible hose and to define the generally horizontal storage position thereof.

3. The recreational vehicle or the like of claim 2 wherein the storage compartment is defined in part by a trap door which supports said housing and hose when closed and which can pivot downwardly below the vehicle body to release said housing from said compartment following which said housing can be moved together with said hose so as to extend outwardly from the vehicle body.

4. The recreational vehicle or the like of claim 3 wherein said storage compartment also includes an upper door which can be opened to gain access to said compartment and to permit release of said trap door to allow it to pivot downwardly.

5. The recreational vehicle or the like of claim 4 wherein said upper door is shaped to define a step to facilitate entry into the vehicle body, the step-door thus defined being pivotally mounted for movement from a lower step-providing position overlying the top of the storage compartment to a raised position wherein access to the interior of the storage compartment is gained.

6. The recreational vehicle or the like of claim 5 including a fixed rail extending along said one side of the vehicle body and outboard thereof for supporting said step-door when in the down, step-providing position.

7. The recreational vehicle or the like of claim 6 wherein said trap door has hooks hingedly affixed thereto along an outer edge thereof and adapted to be hooked onto said fixed rail to releasably secure said trap door in the raised housing and hose supporting position.

8. The recreational vehicle or the like of claim 7 wherein said step-door, in the down position, overlies said trap door hooks to substantially prevent accidental release thereof from said rail.

9. The recreational vehicle or the like of claim 1 wherein said vehicle includes downwardly extended lower side wall portions and wherein said proximal end of said elongated housing includes a relatively short housing section loosely pivotally connected between said tank waste outlet and the remaining section of said elongated housing to permit said housing sections to drop downwardly by a selected distance below the waste tank outlet so as to clear bottom edge portions of the vehicle lower side wall portions when said elongated housing is moved to an outwardly extending position relative to the vehicle sidewall.

10. The recreational vehicle or the like of claim 9 wherein said relatively short-housing section has tapered or wedge shape ends to allow a substantial degree of articulation of the housing sections relative to one another and to said tank waste outlet.

11. The recreational vehicle of claim 10 further including a shield element to prevent said hose from escaping the housing when in the storage position.

12. The recreational vehicle or the like of claim 9 including further structures defining a storage compartment extending part-way alongside said one side of the body adjacent said lower portion of the vehicle body and adapted to receive said housing and said extendible hose and to define the generally horizontal storage position thereof.

13. The recreational vehicle or the like of claim 12 wherein the storage compartment is defined in part by a trap door which supports said housing and hose when closed and which can pivot downwardly below the vehicle body to release said housing from said compartment following which said housing can be moved together with said hose so as to extend outwardly from the vehicle body.

14. The recreational vehicle or the like of claim 13 wherein said storage compartment also includes an upper door which can be opened to gain access to said compartment and to permit release of said trap door to allow it to pivot downwardly.

15. The recreational vehicle or the like of claim 14 wherein said upper door is shaped to define a step to facilitate entry into the vehicle body, the step-door thus defined being pivotally mounted for movement from a lower step-providing position overlying the top of the storage compartment to a raised position wherein access to the interior of the storage compartment is gained.

* * * * *